United States Patent Office 2,712,781
Patented July 12, 1955

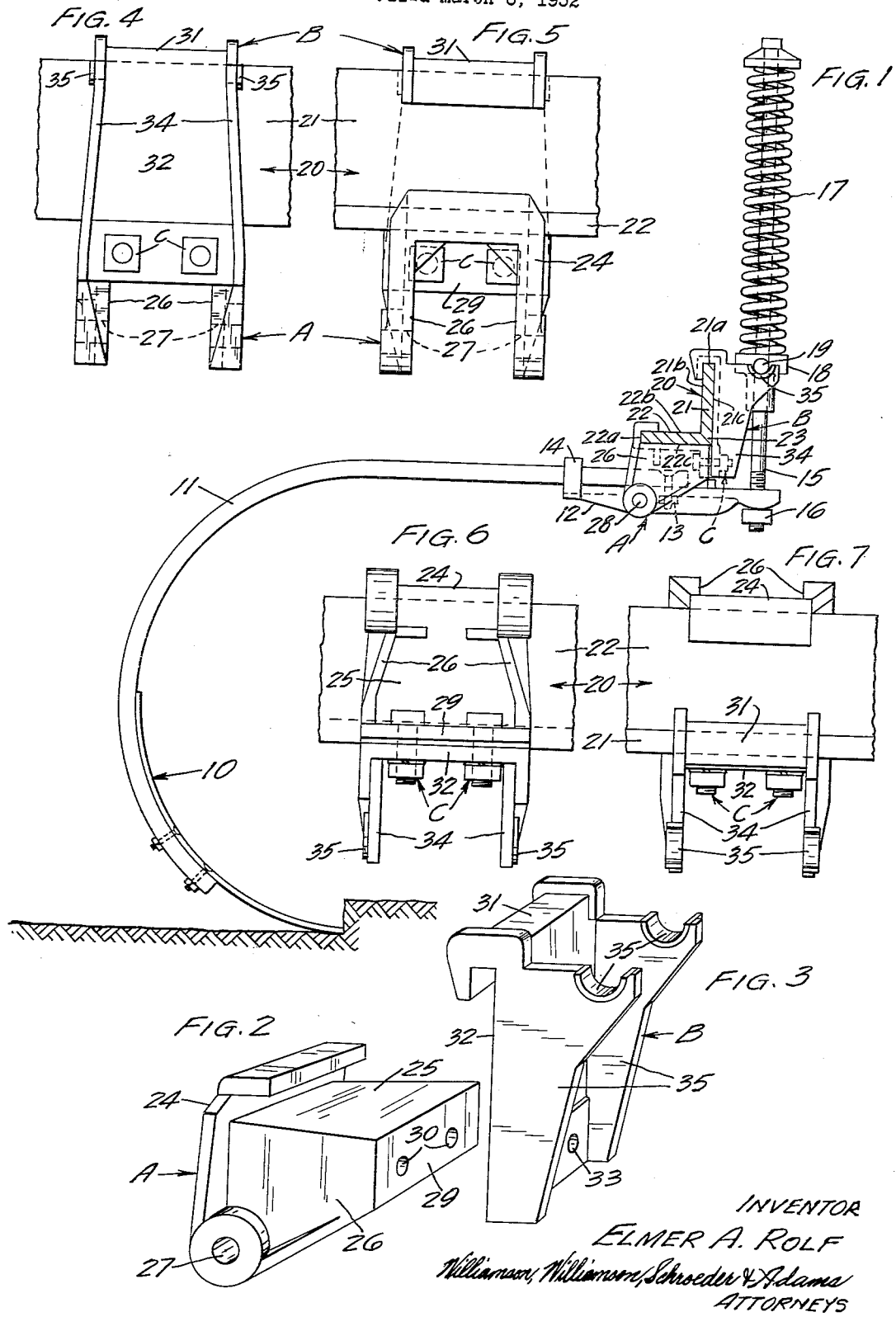

2,712,781

MOUNTING FOR EARTH TILLER

Elmer A. Rolf, Glencoe, Minn., assignor to Glencoe Manufacturing Company, Glencoe, Minn., a corporation of Minnesota Application March 6, 1952, Serial No. 275,109

4 Claims. (Cl. 97—47.84)

This invention relates to means for mounting an agricultural implement upon a cross member of a vehicle. More particularly, it relates to means for pivotally mounting by its supporting shank an agricultural implement upon such a cross member.

Mountings for agricultural implements such as deep earth tilling devices are generally adapted to be secured to a cross member of the vehicle. Frequently these cross members are shaped cross sectionally as angle irons and in such instances the mountings are normally connected thereto by bolts which pierce the cross member itself and the mounting. Thus it is impossible to adjust the position of the earth tilling device laterally of the cross member without providing a plurality of apertures in the cross member for that purpose and without first entirely removing the securing bolts. This involves considerable inconvenience and a substantial waste of time and effort. My invention is directed toward providing a mounting for use on such a cross member which will obviate these disadvantages.

It is a general object of my invention to provide a novel and improved mounting for attaching an agricultural implement and the like by its supporting shank to a cross member, the mounting being of cheap and simple construction.

A more specific object is to provide a novel and improved mounting for attaching an agricultural implement and the like by its supporting shank to a cross member in a manner which will permit quick and easy lateral adjustment of the implement along the length of the cross member.

Another object is to provide a novel and improved mounting for pivotally mounting an agricultural implement by its supporting shank upon a cross member consisting of two separate parts and which may be easily manufactured at low cost.

Another object is to provide a novel and improved mounting for attaching an agricultural implement and the like by its supporting shank to a cross member shaped similarly to an angle iron, the mounting being capable of being moved laterally along the length of the cross member after a simple and slight adjustment thereof and of being rigidly affixed thereto by a similar slight readjustment.

These and other objects and advantages of my invention will more fully appear from the following description made in connection with the accompanying drawings, wherein like reference characters refer to similar parts throughout the several views, and in which:

Fig. 1 is a side elevational view of one embodiment of my invention positioned for use and supporting an earth tilling agricultural implement;

Fig. 2 is a perspective view of one member of the mounting;

Fig. 3 is a perspective view of the other member of the mounting;

Fig. 4 is a front elevational view of the two members shown in Figs. 2 and 3 assembled;

Fig. 5 is a rear elevational view of the two members of the mounting assembled;

Fig. 6 is a bottom elevational view of the two members of the mounting assembled; and Fig. 7 is a top plan view of the two members of the mounting assembled.

One embodiment of my invention is shown in Figs. 1–7 and used to mount an agricultural implement 10 of the deep earth tilling type. As shown, this agricultural implement has a shank 11 which supports the implement from the vehicle to which it is attached as is a custom for such implements. The shank 11 is provided with a pivot plate 12 to which the shank is rigidly connected by means of a bolt 13 and a sleeve element 14 at the rearward end of the pivot plate 12, this sleeve element receiving the shank 11 therein. As best shown in Fig. 1, the pivot plate 12 is provided with a cross aperture at its medial portions so that the plate may be pivotally mounted on the mounting which comprises the invention. A vertical aperture at the forward end of the pivot plate 12 is adapted to receive an upstanding rod 15 therein. This rod is secured to the pivot plate by a nut 16 and extends upwardly therefrom, carrying a compression spring 17 at its upper portion and a collar 18 between the spring and the pivot plate. The collar 18 is mounted in free sliding relation upon the rod 15 and has a pair of opposite and outwardly extending ears 19 adapted to cooperate with the one member of the mounting which comprises the invention to maintain the spring 17 in compressed relation.

As best shown in Fig. 1, such agricultural implements 10 are normally mounted upon a cross member 20 of the vehicle (not shown) so that more than one of the implements may be mounted in side by side relation. Frequently, this cross member is shaped similarly to a piece of angle iron and it has been shown in such shape in Fig. 1. When so shaped the cross member 20 has two legs, one 21 of which extends substantially vertically and the other 22 of which extends substantially horizontally. These two legs 22 and 21 are connected at their inner end portions as at 23 and their outer end portions 21a and 22a are free. It will be readily seen that each of the legs 21 and 22 have surfaces 21b and 22b which face each other, and for convenience will be hereinafter called the inner sides, and have surfaces 21c and 22c which face away from each other, and for convenience will be hereinafter called the outer sides of the legs.

The invention as shown is comprised of a pair of channel or engaging members indicated generally as A and B which, when in use, are connected together by a pair of bolts indicated generally as C.

The channel member A has one of its end portions formed into a channel 24. One wall 25 of the channel extends outwardly well beyond the other wall and to a point adjacent where the two legs of the cross member 20 meet when the free end portion 22a of the cross member is carried within the channel. This channel 24 is adapted to receive the free end portion 22a therewithin and to engage the horizontal leg 22 of the cross member 20 as a result of being so received. A pair of spaced parallel depending webs 26 extend downwardly from the sides of the channel member A and these depending webs have cross apertures 27 aligned to receive a pivot pin 28. As can best be seen in Fig. 1, the pivot pin 28, when carried within the apertures 27, pivotally supports the mounting plate 12 and in turn the implement 10 by means of its shank 11.

A cross connector portion 29 connects the two webs 26 adjacent the end of the channel member A which is opposite its channel, as best shown in Fig. 2. This cross connector portion is provided with a pair of apertures 30 adapted to receive the shoulders C therewithin.

The channel member B has its upper end portion formed into a channel 31 and has one wall 32 of the channel extending downwardly well beyond the other and adapted to lie along the vertical side of the cross member 20 in a manner similar to the manner in which the channel member A lies along the horizontal leg. This can best be seen in Fig. 1. A pair of apertures 33 are formed in the lower end portion of channel member B and are positioned so as to be directly opposite the apertures 30 of the channel member A when each of these members are positioned as shown in Fig. 1. The channel 31 is adapted to receive and engage the free end portion 21a of the upstanding leg 21 of the cross member.

The channel member B has a pair of spaced parallel generally triangularly shaped side portions 34 which extend forwardly from the surface thereof which lies along the outer surface of the vertical leg of the cross member. Aligned grooves or recesses 35 are formed in the upper surface of each of these side portions to receive therein the outwardly extending ears of the collar 18 when the mounting is assembled.

To assemble the mounting the mounting plate 12 which is rigidly connected to the shank 11 is pivotally connected to the channel member A by means of inserting the pivot pin 28 through the apertures 27 and the apertures provided in the mounting plate for that purpose. The channel member A is positioned on the horizontal leg 22 of the cross member so that the upper end portion of the leg 22 is received in the channel 24 and so that the surface 25 of the channel member A lies along the outer surface 22c of that leg. The other channel member B is then positioned so that the free end portion 21a of the vertical leg 21 is received within the channel 31 and so that the surface 32 of the channel member B extends along the outer side 21c of the vertical leg of the cross member. This is best shown in Fig. 1. By inserting the bolt C these two channel members A and B may be drawn toward each other so as to firmly engage the cross member 20 and rigidly mount the agricultural implement 10 thereupon. The collar 18 may then be slid upwardly so as to compress the spring 17 and to position the ears 19 within the grooves 35 of the channel member B. Thus, the agricultural implement 10 will be constantly urged downwardly by the compressed spring 17 which will urge the forward end of the mounting plate 12 upwardly and consequently the shank 11 downwardly.

The important advantage of my mounting for such an implement is that this mounting makes it possible to readily adjust the positioning of the agricultural implement 10 relative to the length of the cross member 20. In other words, it is possible with my mounting to move the mounting itself and the agricultural implement laterally with respect to the cross member. In mountings previously used it has always been necessary to completely remove the mounting bolts and reinsert them in new apertures if and when it was desired to adjust the positioning of the agricultural implement laterally of the machine and along the length of the cross member. With my mounting all that is necessary is to loosen the nuts on the bolts C a few turns and immediately the entire mounting may be moved to either side along the length of the cross member 20. A few tightening turns on these same bolts C will again rigidly affix the mounting to the cross member 20 and the machine will thereupon be again ready for use.

Thus it can be seen that I have provided a mounting which permits ready adjustment of the agricultural implement laterally of the cross member, this adjustment being possible within a minimum of time and with a minimum of effort and inconvenience. An adjustent of the agricultural implement can be made when my mounting is utilized in less than a minute whereas with the type of mounting where the bolts must be completely removed and reinserted in new apertures, the adjustment requires a substantial amount of time.

In addition to the fact that my mounting facilitates and expedites the adjustment of such an agricultural implement relative to its supporting cross member, I have provided a mounting which is substantially easier and cheaper to manufacture. I have found that the cost of manufacturing my mounting is substantially less than the cost of manufacturing a mounting which will not permit such ready adjustment and which normally is manufactured in a single piece. By forming my mounting in two separate pieces I have attained both the simplest and the cheapest form and at the same time have provided the maximum in efficiency in the way of such a mounting.

It will, of course, be understood that various changes may be made in the form, details, arrangement and proportions of the various parts without departing from the scope of my invention.

What is claimed is:

1. A readily adjustable mounting for attaching an agricultural implement and the like by its supporting shank to a cross-member having angulated legs connected by their inner end portions and extending away from each other with their outer end portions free, said mounting comprising a channel member having one wall of the channel being straight throughout its length and extending well beyond the other and adapted to be positioned along a single leg of such a cross-member with the free end portion of such leg received in the channel of and engaged by said member, connector means carried by said member for connecting the shank of such an implement pivotally to said channel member, said means including a pair of laterally spaced depending webs with opposed transversely extending openings therethrough, a second channel member having one wall of its channel being straight throughout its length and extending well beyond the other and adapted to be positioned along the other leg only of such a cross-member with its channel facing toward the channel of said first mentioned channel member and with the free end portion of such other leg received in the channel of and engaged by said second channel member, said channel members meeting when so positioned opposite the point of connection of the legs of the cross member and means for releasably drawing said two channel members toward each other when they are so positioned whereby they may positively engage the free end portions of such legs of such a cross-member within their respective channels to firmly mount such an implement upon such cross-member.

2. A readily adjustable mounting for attaching an agricultural implement by its supporting shank to a cross member having angle iron shape with one of its legs extending substantially horizontally and the other of its legs extending substantially vertically, the outer end portions of such legs being free and the inner end portions thereof being connected, said mounting comprising a channel member having a channel formed at one of its ends and with one wall of the channel extending well beyond the other and adapted to be positioned along the lower side of such horizontal leg with the free end portion of such of leg received in the channel of and engaged by said member, a pair of spaced parallel webs depending from the sides of said channel member and having a pair of aligned cross apertures formed in the lower end portions thereof, a second channel member having a channel formed at its upper end portion and having one wall of its channel extending well beyond the other and adapted to be positioned along the outer surface of the vertical leg of such cross member with its channel facing toward the channel of said first mentioned channel member and with the free end portion of such vertical leg received in the channel of and engaged by said second channel member, said second mentioned channel member having a pair of spaced parallel side portions with aligned grooves formed in their upper surfaces, said channel members when so positioned extending to a point closely adjacent to each other, means for releasably connecting said two channel members and for positively drawing the same toward each other when they are so positioned whereby they may be caused to positively engage the free end portions of such legs of such a cross-member within their respective channels, said connecting means being capable of being readily loosened slightly whereby said channel members may be moved longitudinally of such cross-member with ease, a pivot pin carried in said apertures in the lower end portions of said first mentioned channel member, a mounting plate adapted to be fixedly secured to the shank of such an implement, said mounting plate being pivotally mounted at its medial portion upon said pivot pin, an upstanding rod connected to the forward end portion of said mounting plate, a coiled compression spring carried by said rod upon the upper portion thereof and in pierced relation, and a free sliding collar mounted on said rod between said compression spring and said mounting plate, said collar having a pair of outwardly extending ears adapted to fit into said aligned grooves of said side portions of said second mentioned channel member to engage the same and maintain said compression spring in compressed relation while so positioned.

3. A readily adjustable mounting for attaching an agricultural implement and the like by its supporting shank to a cross member having angulated legs connected at their inner end portions and extending away from each other with their other end portions free, said mounting comprising a channel member having one wall of the channel being straight throughout its length and extending well beyond the other and adapted to be positioned along a single leg of such a cross member with the free end portion of such leg received in the channel of and engaged by said member, connector means carried by said member for connecting the shank of such an implement thereto, a second channel member having one wall of its channel being straight throughout its length and extending well beyond the other and adapted to be positioned along the other leg only of such a cross member with its channel facing toward the channel of said first mentioned member and with the free end portion of such other leg received in the channel of and engaged by said second channel member, and means for releasably drawing said two channel members toward each other when they are so positioned whereby they may positively engage the end portions of such legs of such a cross member within their respective channels to firmly mount such an implement upon such cross member.

4. A readily adjustable mounting for attaching an agricultural implement and the like by its supporting shank to a cross member having angulated legs connected at their inner end portions and extending away from each other with their other end portions free, said mounting comprising a channel member having one wall of the channel being straight throughout its length and extending well beyond the other end and adapted to be positioned along a single leg of such a cross member with the free end portion of such leg received in the channel of and engaged by said member, connector means depending from opposite sides of said member for pivotally connecting the shank of such an implement thereto, a second channel member having one wall of its channel being straight throughout its length and extending well beyond the other and adapted to be positioned along the other leg only of such a cross member with its channel facing toward the channel of said first mentioned channel member and with the free end portion of such other leg received in the channel of and engaged by said second channel member, and threaded means for releasably drawing said two channel members toward each other when they are so positioned whereby they may positively engage the end portions of such legs of such a cross member within their respective channels to firmly mount such an implement upon such cross member.

References Cited in the file of this patent

UNITED STATES PATENTS

| | | |
|---|---|---|
| 521,272 | Schauman | June 12, 1894 |
| 894,787 | Waterman | July 28, 1908 |
| 982,965 | Johnson | Jan. 31, 1911 |
| 2,493,811 | Graham | Jan. 10, 1950 |
| 2,595,352 | Graham | May 6, 1952 |

FOREIGN PATENTS

| | | |
|---|---|---|
| 57,391 | Denmark | Mar. 18, 1940 |
| 672,621 | France | Sept. 23, 1929 |